US008457590B2

(12) United States Patent
Mitsuhashi

(10) Patent No.: US 8,457,590 B2
(45) Date of Patent: Jun. 4, 2013

(54) EMERGENCY INFORMATION PROMPT REPORT SYSTEM

(75) Inventor: Masaru Mitsuhashi, Tokyo (JP)

(73) Assignee: Kabushiki Kaishi Toshiba, Tokyo (JP)

( * ) Notice: Subject to any disclaimer, the term of this patent is extended or adjusted under 35 U.S.C. 154(b) by 382 days.

(21) Appl. No.: 11/519,000

(22) Filed: Sep. 12, 2006

(65) Prior Publication Data

US 2007/0182586 A1 Aug. 9, 2007

(30) Foreign Application Priority Data

Feb. 7, 2006 (JP) ................................. 2006-030308

(51) Int. Cl.
*H04M 11/04* (2006.01)

(52) U.S. Cl.
USPC .................. 455/404.1; 455/404.2; 455/414.2; 455/456.1; 725/33; 725/62

(58) Field of Classification Search
USPC ........ 455/404.1, 404.2, 414.1, 456.1; 725/33, 725/35, 62; 379/37
See application file for complete search history.

(56) References Cited

U.S. PATENT DOCUMENTS 4,198,600 A * 4/1980 Oguchi et al. .................. 455/15
4,839,892 A * 6/1989 Sasaki ........................... 370/348
6,084,510 A * 7/2000 Lemelson et al. ........ 340/539.13
6,543,051 B1 4/2003 Manson et al.
6,856,590 B2 * 2/2005 Okada et al. .................. 370/208
7,230,734 B2 * 6/2007 Hirata .......................... 358/1.15
7,697,918 B2 * 4/2010 Mitsuhashi et al. ....... 455/404.1
2002/0034214 A1 * 3/2002 Okada et al. .................. 375/147
2003/0018422 A1 * 1/2003 Akiyama ........................ 701/48
2003/0069002 A1 4/2003 Hunter et al.
2003/0196200 A1 * 10/2003 Manson et al. ................. 725/33
2004/0075552 A1 * 4/2004 Rao et al. ................... 340/539.1
2004/0136408 A1 * 7/2004 Tomobe et al. ............... 370/532

(Continued)

FOREIGN PATENT DOCUMENTS

JP 08-256123 10/1996
JP 10-150496 6/1998

(Continued)

OTHER PUBLICATIONS

NOAA Weather Radio (NWR) Specific Area Message Encoding (SAME) Feb. 11, 2005 http://web.archive.org/web/20050828190020/http://www.nws.noaa.gov/directives/010/pd01017012a.pdf.*

(Continued)

*Primary Examiner* — Allahyar Kasraian
(74) *Attorney, Agent, or Firm* — Finnegan, Henderson, Farabow, Garrett & Dunner LLP

(57) ABSTRACT

A monitoring center notifies emergency broadcast request information specifying its broadcast area to a prescribed emergency broadcast processing apparatus when any sensor detects an abnormality and determines that an emergency broadcast is needed. When acquiring the emergency broadcast request information transmitted from a plurality of monitoring centers, the processing apparatus grasps contents specified in the request information to notify information necessary for the emergency broadcast to a broadcast station covering an objective area. When a request instruction for the emergency broadcast is issued, the broadcast station arranges contents of emergency information in free areas in a broadcast format, arranges control information to start receivers in the objective area and also automatically select a channel at a defined position in the broadcast format to create an emergency broadcast signal and multiplexes it with a normal broadcast signal to broadcast it.

4 Claims, 4 Drawing Sheets

U.S. PATENT DOCUMENTS

| | | | | |
|---|---|---|---|---|
| 2006/0015915 | A1* | 1/2006 | Yun | 725/108 |
| 2006/0020992 | A1 | 1/2006 | Pugel et al. | |
| 2007/0021099 | A1* | 1/2007 | Sato | 455/404.1 |
| 2007/0182585 | A1* | 8/2007 | Mitsuhashi et al. | 340/902 |
| 2007/0275690 | A1* | 11/2007 | Hunter et al. | 455/404.2 |
| 2008/0130782 | A1* | 6/2008 | Lannes et al. | 375/295 |

FOREIGN PATENT DOCUMENTS

| | | |
|---|---|---|
| JP | 2004-141417 | 5/2004 |
| JP | 2004-180048 | 6/2004 |
| JP | 2005-79753 | 3/2005 |
| JP | 2005-189185 | 7/2005 |
| JP | 2005-197907 | 7/2005 |
| JP | 2005-198079 | 7/2005 |
| JP | 2005191904 A * | 7/2005 |
| JP | 2005-295053 | 10/2005 |
| WO | WO 2006/008825 | 1/2006 |

OTHER PUBLICATIONS

Chaehag Yi, "TDM framing for gap filler operation in satellite digital multimedia broadcasting System A", 2004. VTC 2004—Spring, Vehicular Technology Conference, 2004 IEEE 59th, vol. 5, May 17-19, 2004 pp. 2782-2786, vol. 5, Digital Object Identifier 10.1109/VETECS.2004.1391428.* http://www.geocities.co.ip/Technopolis/1549/kinkei.htrn "What is emergency warning system (EWS)?".

Notice of Reasons for Rejection, mailed Aug. 11, 2009, in Japanese Application No. 2007-028424 (10 pages).

"6.2.24 Emergency Information Descriptor," Standard of Service Information for Digital Broadcasting System ARIB STD-B10, Association of Radio Industries and Businesses, Jun. 20, 2000, 1st and rd editions, pp. 110 and 111 (5 pages).

Notice of Reasons for Rejection, mailed Oct. 19, 2010, in Japanese Patent Office, in Japanese Patent Application No. 2009-236487, and English translation thereof (7 pages).

Communication from the European Patent Office, dated Feb. 21, 2012, in European Patent Application No. 06019049.3 (6 pages).

Final Notice of Rejection, mailed Mar. 15, 2011, from the Japanese Patent Office, in Japanese Patent Application No. 2009-236487, and English translation thereof (5 pages).

Extended European Search Report mailed May 25, 2011, in European Application No. 06019049.3 (9 pages).

Anonymous, "NOAA Weather Radio (NWR) Specific Area Message Encoding (SAME)," National Weather Service Instruction, vol. 10-1712, Feb. 11, 2005 (24 pages).

Canadian Office Action in counterpart Canadian Application No. 2,559,438, dated Jan. 14, 2013. 3 pages.

* cited by examiner

EMERGENCY INFORMATION PROMPT REPORT SYSTEM

CROSS-REFERENCE TO RELATED APPLICATIONS

This application is based upon and claims the benefit of priority from prior Japanese Patent Application No. 2006-030308, filed Feb. 7, 2006, the entire contents of which are incorporated herein by reference.

BACKGROUND OF THE INVENTION

1. Field of the Invention

The present invention relates to an emergency information prompt report system accurately and quickly broadcasting emergency information such as disaster information and disaster prevention information by utilizing a digital broadcast system, for instance, a terrestrial digital broadcast.

2. Description of the Related Art

Specifications of a terrestrial digital broadcast now having come into wide use currently regulates only first class start (earthquake warning) and second class start (tidal wave warning) as conditions to perform an emergency warning broadcast, because the defined specifications have taken over the specifications of the conventional terrestrial analog broadcast.

On the other hand, in a broadcast field, a technology to broadcast new type of emergency information such as an emergency earthquake prompt report has been developed. However, as matters now stand, the technology which has been under development is still not matched not only to the new type of the emergency information but also to municipality local disaster prevention information which has been transmitted in the disaster prevention radio system and to the emergency broadcast in a closed space.

Now, as for this kind of the emergency broadcast, the Web site of http://www.geocities.co.jp/Technopolis/1549/kinkei.thm#jissi "what is emergency warning system (EWS)?" discloses it in detail.

As mentioned above, as it now stands, although the digital broadcast system has been expected as an accurate and quick notification means for the emergency information, it has been in a state that it cannot sufficiently respond to the expectation yet.

BRIEF SUMMARY OF THE INVENTION

An object of the present invention is to provide an emergency information prompt report system and its transmitting system apparatus capable of accurately and quickly notifying emergency information such as disaster information and disaster prevention information.

An emergency information prompt report system which promptly reports requested emergency information to a specified area by utilizing a broadcast system in which a broadcast station multiplex area-specified local information with normal programs to broadcast it, comprises a plurality of emergency information requesting apparatuses which request prompt reports of the emergency information by specifying areas and time zones; emergency broadcast processing apparatus which automatically receives the emergency information requested from the plurality of emergency information requesting apparatuses and specifies the areas and time zones to the broadcast station to instruct the prompt reports of the emergency information; and emergency broadcast in-station processing apparatuses which are installed in the plurality of the broadcast station and multiplex the emergency information with broadcast signals of the normal programs as the local information in the specified time zones and for the specified areas in response to instructions from the emergency broadcast processing apparatuses.

The broadcast system is a digital broadcast system in which it is defined to instruct presentation start of the emergency information by class predetermined by each value of a start/end flag bit and a transmission/signal class bit of an emergency information descriptor, and the digital broadcast signal includes related information of the emergency information to use an instruction of the presentation start of the emergency information for presentation start of the related information of the emergency information.

Especially, when the start/end flag bit of the emergency information descriptor transmits "1", and the transmission/signal class bit thereof transmits "0", if it is defined that presentation start of a first-class start signal defined in a radio station operation rule is instructed as the emergency information, earthquake related information, or earthquake information and other emergency information are included as the related information.

When the start/end flag bit of the emergency information descriptor transmits "1", and the transmission/signal class bit thereof transmits "1", if it is defined that the broadcast system instructs presentation start of a second-class start signal defined in the radio station operation rule as the emergency information, the broadcast system includes tidal wave related information, or tidal wave and other emergency information as the related information.

When the digital broadcast signal includes the forgoing other emergency information, and when the start/end flag bit of the emergency information descriptor transmits "0" and the transmission/signal class bit thereof transmits "1", the broadcast system instructs presentation start of the forgoing other emergency information.

The forgoing other emergency information means any of disaster information, disaster prevention information, local information and message information.

A transmitting system apparatus used for the emergency information prompt report system regarding the present invention performs mapping the signal class bit with a specified auxiliary channel (AC) signal, when the digital broadcast signal is a terrestrial digital broadcast signal.

The start/end flag bit is mapped to a transmission and multiplexing configuration control (TMCC) signal.

Contents of the emergency broadcast describer are mapped to a specified AC carrier.

The digital broadcast signal is the terrestrial digital broadcast signal and the emergency information is mapped to either a transmission stream (TS) or an AC carrier of an orthogonal frequency division multiplex (OFDM) signal.

The mapping to the AC carrier is mapped in a frequency direction when a prompt report property is required, and mapped in a time axis direction in the case of emergency information with a higher regard to a mobile object.

A start up processing of the emergency information by means of the start/end flag bit and the transmission/signal class flag bit corresponds only to a broadcast signal for an area specified by a transmission request for the emergency information.

The emergency information prompt report system further comprises one or more data servers to store processing results from the emergency broadcast processing apparatus therein, and in the case of use of more than one data server, they are disposed at different locations from one another.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
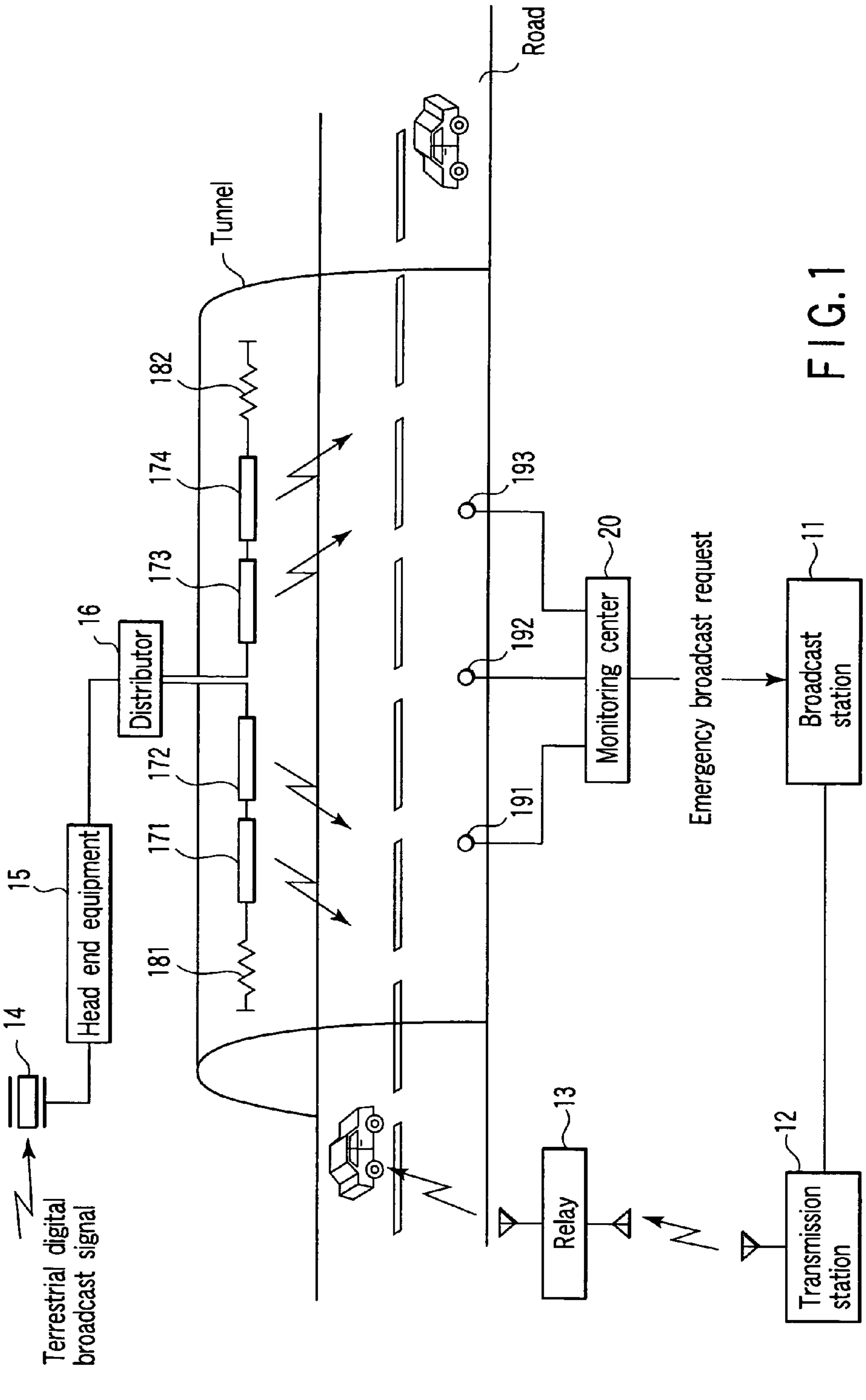
FIG. 1 is an exemplary schematic configuration view showing an embodiment of an emergency information prompt report system regarding the present invention.

Hereinafter, the detail of the embodiment of the present invention will be described with reference to the drawings. An emergency information prompt report system regarding the embodiment utilizes a terrestrial digital broadcast system employing a standard system (announcement by Ministry of Internal Affairs and Communications) relating to a digital broadcast out of Japanese standard television broadcast, etc. And an emergency warning signal is defined as follows:

(1) In a configuration of an emergency information descriptor defined in the aforementioned standard system, when a start/end flag transmits "1" and a transmission/signal class transmits "0", the emergency alarm signal is defined as a first-class start signal defined in a radio station operation rule and a start signal of earthquake related information.

(2) In a configuration of an emergency information descriptor defined in the aforementioned standard system, when the start/end flag transmits "1" and the transmission/signal class transmits "0", the emergency warning signal is defined as a first-class start signal defined in a radio station operation rule, and as a start signal of the earthquake related information and a start signal of other emergency broadcast.

(3) In a configuration of an emergency information descriptor defined in the aforementioned standard system, when the start/end flag transmits "1" and the transmission/signal class transmits "1", the emergency warning signal is defined as a second-class start signal defined in the radio station operation rule, and a start signal of tidal wave related information.

(4) In a configuration of an emergency information descriptor defined in the aforementioned standard system, when the start/end flag transmits "1" and the transmission/signal class transmits "1", the emergency warning signal is defined as the second-class start signal defined in the radio station operation rule, the start signal of tidal wave related information, and the start signal of other emergency broadcasts.

(5) In a configuration of an emergency information descriptor, when the start/end flag transmits "0" and the transmission/signal class transmits "1", the emergency warning signal is defined as the start signal of other emergency broadcast except the first-class start signal and the second-class start signal defined in the radio station operation rule.

(6) Other emergency broadcasts include information necessary for disaster prevention such as an emergency earthquake prompt report, an emergency tidal wave prompt report, flood, fire, insurgence, terror and invasion, and local disaster prevention information from a municipality, an official agency, a means of transportation, a public agency, etc.

In this embodiment, the employed methods for transmitting a variety of items of information are:

(7) Signal classes of paragraphs (1), (2), (3), (4) and (5) are put on a specific AC carrier.

(8) In a receiver, the paragraphs (1), (2), (3), (4) and (5) detect the start/end flags by correlating time axis signals of TMCC demodulation or OFDM, and detect signal classes by correlating specified AC carrier demodulation or time axis signals of the OFDM. In current emergency warning information, the start/end flags are put on the TMCC, but the signal classes are not put on the TMCC.

(9) Contents of the emergency broadcast descriptor are put on the AC carrier.

(10) An emergency broadcast is put on a TS and the AC carrier of the OFDM.

(11) In the paragraphs (7)-(10), mapping to the AC carrier is performed in a frequency axis direction. In this case, a prompt report property of the broadcast is obtained. In the case of information for a mobile object, the mapping to the AC carrier is performed in a time axis direction. In this case, this method is better for a partial broadcast in one segment enabling the mobile object to receive the broadcast (so-called one segment broadcast).

(12) Combining any one of the paragraphs (1)-(5) with the paragraphs (6)-(11) make it possible to transmit a variety of items of emergency information to a person who desires them at a high speed. Further, a person who does not need the emergency information can receive a normal broadcast.

(13) Other emergency broadcasts described in the paragraph (6) are transmitted by requesting them to a broadcast station from the state, municipality, official agency, means of transportation, and public agency.

(14) An apparatus for requesting other emergency broadcasts to the broadcast station as mentioned in the paragraph (13) has one or more sensors and has one or more input means. An apparatus for transmitting other emergency broadcasts the broadcast station is a network in a general public network, a cable telephone, an optical communication, a portable terminal, a satellite telephone, etc. Requesting contents request a client of the emergency broadcast, an area in need of the emergency broadcast, contents of the emergency broadcast, and a handling method of the emergency broadcast other than the request by voice.

Hereinafter, the embodiment will be set forth by taking specific examples.

At first, the emergency information prompt report system defines the emergency broadcast except first-class start (earthquake warning) and second-class start (tidal wave warning) as other emergency broadcast. The report system transmits and receives emergency broadcast by applying OFDM modulation there to in accordance with the definitions.

Since a part of the paragraphs (1), (2), (3) and (4) are conventional methods, the report system starts urgently, however, the report system starts the emergency broadcast as an output of an error correction, time de-interleave and TS decoding, so that it has taken a long time to start a receiver after the emergency broadcast start is transmitted from the broadcast station, before the receiver distinguishes the first-class start (earthquake warning) and the second-class (tidal wave warning), detects a local code and transmits the information. And, since the paragraphs (1), (2), (3), (4) and (5) emergency warning signals are started urgently as outputs of the error correction, time de-interleave and TS decoding, after the broadcast station transmits the emergency broadcast start, it will take a long time before the receiver starts up. For instance, a prompt report property is required in seconds for the emergency earthquake prompt report. To satisfy such a need, it is necessary for the report system to start the receiver and transmit the emergency information by a signal detected before the OFDM demodulation or just after the OFDM demodulation. For that purpose, as the paragraph (11), it is needed to perform the mapping to the AC carrier in the frequency axis direction.

The paragraph (12) will be described as an example.

In the configuration of the emergency information descriptor defined in the paragraph (5), the start/end flag transmits "0" and the signal class transmits "1", and other emergency broadcast except the first-class start signal and the second-class start signal defined in the radio station operation rule transmits the emergency earthquake prompt report defined in the paragraph (6). For instance, the emergency earthquake prompt report is described in an undefined area in the emergency information descriptor. The start/end flag, the signal class and a local code are also described in the emergency information descriptor. The report system performs the mapping of the emergency information descriptor to the specified AC carrier in accordance with the paragraph (9). The mapping is performed in the time axis direction according to the paragraph (11). Voices in the emergency broadcast are conducted in the time axis direction of the specified AC carrier, and images in the emergency broadcast are conducted by multiplexing them onto the TS in accordance with the paragraph (10).

In the case of a fixed reception, the receiver uses a preset system or a global positioning system (GPS) as a means for grasping the reception position, and in the case of a mobile reception, it uses the GPS for grasping it. The receiver applies OFDM demodulation to the received OFDM signal to extract the emergency information descriptor from the specified AC carrier. This extraction is preformed consistently. As a result, at other emergency broadcast except the first-class start signal and the second-class start signal defined in the radio station operation rule, the receiver obtains the local codes to determine whether or not the received OFDM signal is the emergency broadcast at the reception location, and in the event of the emergency broadcast at the reception location (the extraction to determine the emergency broadcast may be performed consistently), and turns on itself if it is off.

As a result, the receiver side becomes possible to quickly transmit the emergency earthquake prompt report to a recipient only by applying the OFDM demodulation. Further, the receiver makes it possible for the recipient to quickly receive voices which have been transmitting on the specified AC carrier. Moreover, the receiver conducts a processing of time de-interleaves, error corrections, or TS decoding and displays the earthquake information which has been transmitting through the specified TS to transmit it to the recipient.

The earthquake related information in the paragraphs (1) and (2) includes, for instance, the emergency earthquake prompt reports. The receiver side notifies that the earthquake related information is the emergency earthquake prompt reports by using the TS after the OFDM demodulation, for example, the undefined area in the emergency information descriptor of the PMT and NIT.

The tidal wave related information in the paragraphs (3) and (4) means, for instance, the emergency tidal eave prompt reports. The receiver side notifies that the tidal wave related information is the emergency earthquake prompt reports by using the TS after the OFDM demodulation, for example, the undefined area in the emergency information descriptor of the PMT and NIT.

Other emergency broadcasts in the paragraph (6) include, for example, volcano eructation information by using TS after the OFDM demodulation, for instance, the undefined area in the emergency information descriptor of the PMT and NIT.

The emergency broadcast descriptor in the paragraph (9), the emergency broadcast descriptor conducts the mapping in the time axis direction onto, for example, the AC carrier of partially receivable "0" segment of the terrestrial digital television broadcast. According to this mapping, the report system can obtain the contents of the emergency broadcast descriptor and quickly start only the receivers being in need of the start up.

In the case of local interruption of other emergency broadcasts through a single frequency network (SFN) relay apparatus, it is required to take coincidences between frame synchronization, symbol synchronization, FFT clocks and carrier phases, and there is a method for taking the coincidences. However, a coincidence between OFDM waves that is requirement conditions of the SFN is not performed. In case of non-coincidence between them, the receiver is brought into a state of deterioration or a not receivable state at an area close to uniform electric field areas among SFN stations. Therefore, as mentioned in the paragraph (13), putting up other emergency broadcasts on the broadcast transmitted from the broadcast station achieves them without affecting on the broadcasts at the area closed to the uniform electric field areas among SFN stations.

FIG. 1 is a schematic view showing an example of the terrestrial digital broadcast system broadcasting the emergency information. In FIG. 1, the broadcast station 11 is one for the terrestrial digital broadcast, and a broadcast signal generated from the broadcast station 11 is transmitted to a transmitting station 12 to transmit it toward a prescribed area. This transmission electric wave is relayed through an SFN relay apparatus 13 to be retransmitted toward a predetermined area.

On the other hand, for instance, in a broadcast system for a closed space (wherein, referred to as tunnel), a receiving antenna 14 receives the broadcast signal transmitted from the transmitting station 12 or the relay apparatus 13. The reception signal is transmitted to head end equipment 15 and after being applied a decode processing in a digital broadcast signal, it is distributed, for example, into a plurality of systems of transmitting antennas 171-174 disposed on a down lane by means of a distributor 16 to be transmitted toward vehicle-mounted receivers in the tunnel. Terminal registers 181 and 182 are connected to end parts of each transmitting antenna system so as not to cause leakages of transmission waves outside the tunnel.

Sensors 191-193 of a monitor or a fire alarm, etc. are installed inside the tunnel to be managed by a monitoring center 20. The monitoring center 20 is provided with a terminal device (not shown) to request the emergency broadcast to the broadcast station 11, and when it senses the occurrence of abnormality at any of the sensors 191-193, it can immediately request the broadcast of the emergency information to the broadcast station 11. It is important for the terminal device for the emergency broadcast to take security measures to reject illegal actions.

The request for the emergency broadcast requests by clearly specifying that when it happened (time), where it happened (tunnel), what happened or in anticipation (fire, etc.), and who (tunnel manager) provides what information to whom (driver) being in any where (in and near tunnel). The requesting information is transmitted through a leased line or an Internet protocol (IP) network, etc.

Figure 2:
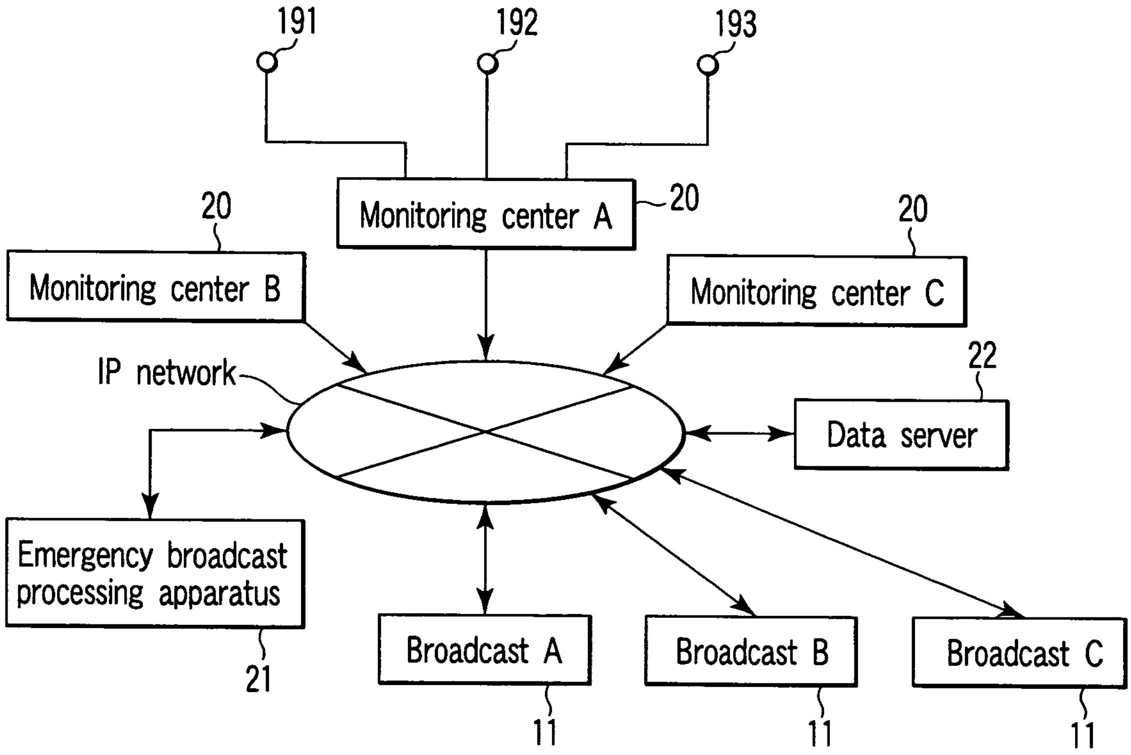
FIG. 2 is an exemplary block diagram showing a specific configuration of an emergency broadcast requesting unit shown in FIG. 1.

FIG. 2 is a schematic configuration view showing a processing system of the request for the emergency broadcast regarding the present invention. A plurality of monitoring centers A, B and C 20 shown in FIG. 1 are located and each connected to the IP network. A plurality of broadcast stations A, B and C 11, one or more emergency broadcast processing apparatuses 21 and one or more data servers 22 are connected to the IP network.

The monitoring centers A, B and C 20 monitor each sensing of abnormalities through the sensors 191-193, when any sensor 191-193 senses the abnormality, it determines the necessity of the emergency broadcast depending on the extent of the abnormality. In the event of the determination of the necessity of the emergency broadcast, the monitoring center 20 notifies emergency broadcast request information specifying its broadcast area and broadcast period to the prescribed emergency broadcast processing apparatus 21 via the IP network and also notifies it to the data server 22. The data server 22 acts as a spare system in an occurrence of a disaster, and it is preferable to be disposed at a plurality of locations. Of course the data server 22 requires any security and should be provided with a protection apparatus to protect it from an illegal action such as terror.

Figure 3:
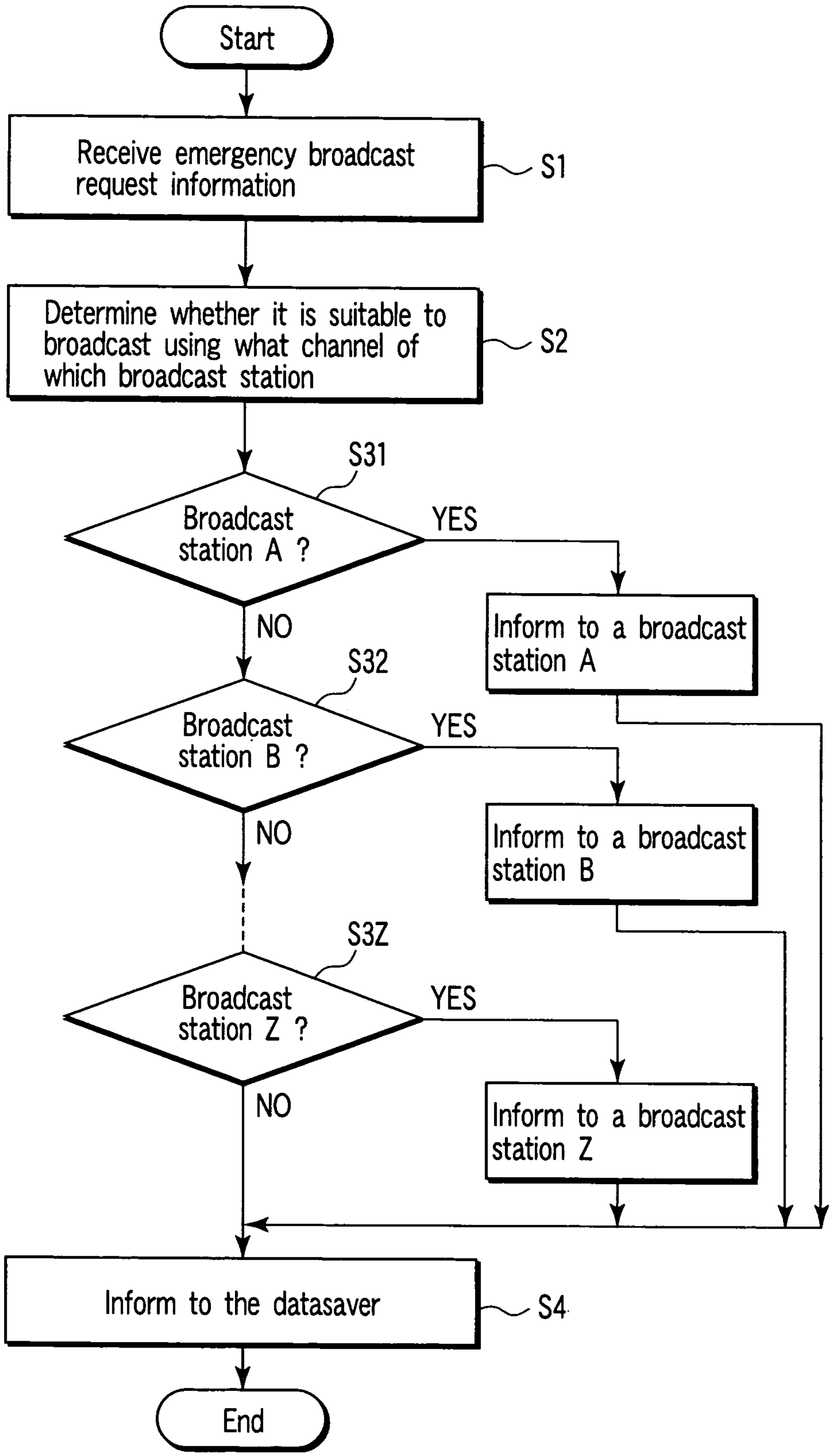
FIG. 3 is a flowchart showing steps of process of a monitoring center shown in FIG. 1.

When the emergency broadcast processing apparatus 21 receives emergency broadcast request information sent from the plurality of monitoring centers 20 (e.g. As in FIG. 2) as shown in FIG. 3, it grasps the designated contents of the information, for example, what occurs, when and where, whether occurrence is predicted and who requests anyone of any place, and determines whether it is suitable to broadcast using what channel of which broadcasting station (step S2). An object broadcast station 11 is searched for by search steps S31-A3Z. The emergency broadcast processing apparatus 21 informs an appropriate broadcast station (either one of A to Z) of information necessary for emergency broadcast. The information is informed to the data server (step 4).

In the embodiment, the apparatus shown in FIG. 3 determines a single broadcast station suitable for emergency broadcast, and informs the determined broadcast station of information necessary for emergency broadcast. However, the present invention is not limited to this. In other words, when there are a plurality of broadcast stations suitable for emergency broadcast, it can be realized in easy to inform the necessary information of the plurality of broadcast stations.

Figure 4:
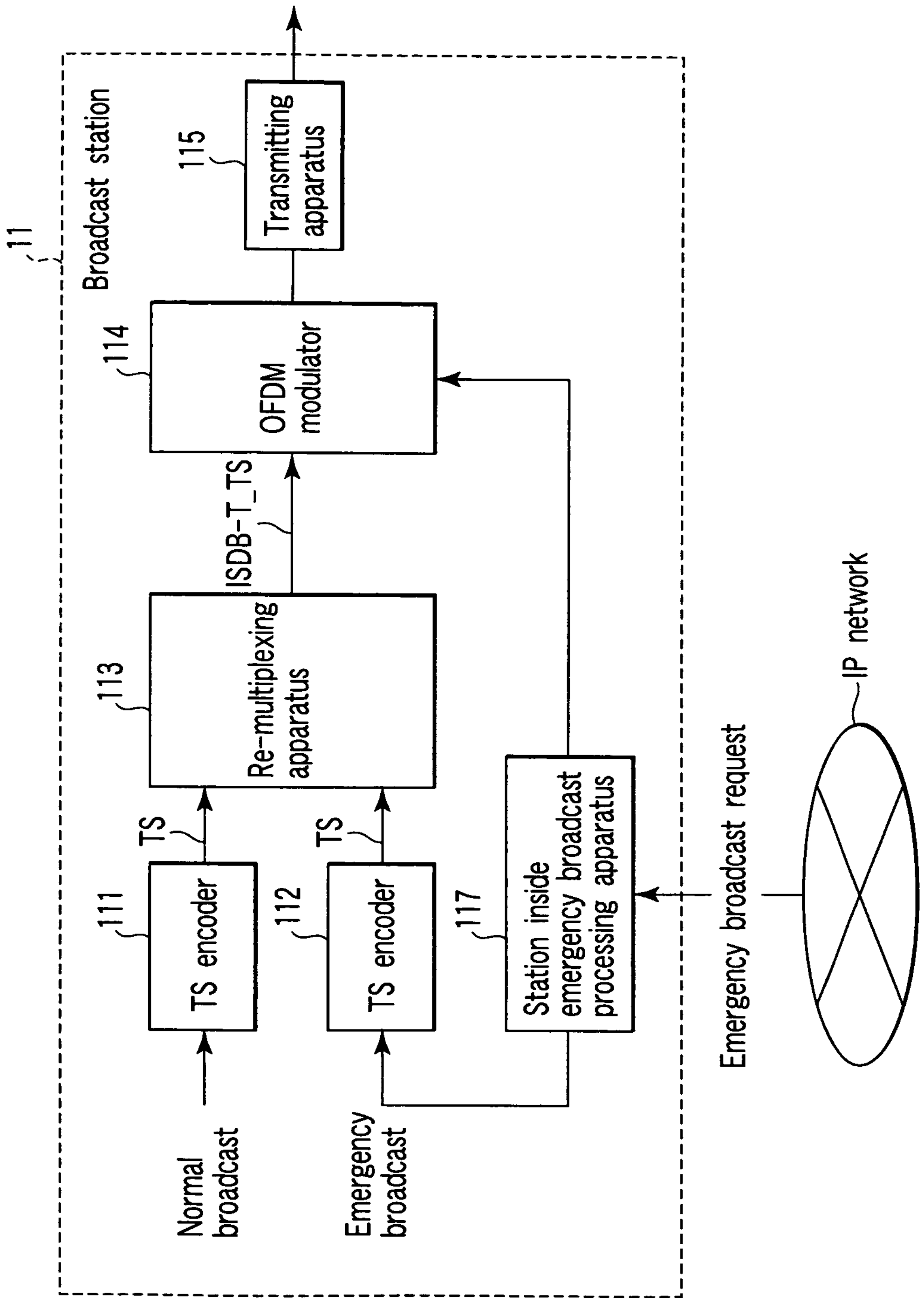
FIG. 4 is an exemplary block diagram showing a specific configuration of a transmitting system apparatus on a broadcast station side of the report system shown in FIG. 1.

FIG. 4 is a block diagram showing a schematic configuration of a transmission system apparatus installed in the broadcast station 11 corresponding to the emergency broadcast. In FIG. 4, a normal broadcast is applied a compression coding from a TS encoder 111 to be supplied to a re-multiplexing apparatus 113, here it is made to a normal broadcast TS signal to be transmitted to an OFDM modulator 114. After applying OFDM modulation at the OFDM modulator 114, the normal broadcast TS signal is power-amplified by a transmitting apparatus 115 and transmitted to the transmitting station 12 shown in FIG. 1 to be transmitted as a terrestrial digital broadcast wave.

Here, when the request instruction for the emergency broadcast is issued, an emergency broadcast processing apparatus 117 responds to apply compression coding to the emergency information (image, voice, data) from a TS encoder 112, and creates an emergency broadcast TS signal by arranging the foregoing start/end flag, and transmission/signal class onto the AC carrier, etc., and transmits it to the re-multiplexing apparatus 113 to multiplex with the normal broadcast TS signal. Thus, even when the emergency broadcast is requested, the report system can correspond to the request automatically, and it becomes possible to transmit the normal broadcast TS together with the emergency broadcast.

As mentioned above, in the emergency information prompt report system configured as given above, when the abnormality is confirmed in the abnormal monitoring area and the emergency broadcast is requested from the monitoring center 20, the emergency broadcast processing apparatus 21 on the network responds it and selects the broadcast station to transmit the broadcast oriented to the relevant area to instruct the emergency broadcast. The broadcast station which has received this request immediately generates the area-specified emergency broadcast TS to broadcast it by multiplexing it with the normal broadcast TS signal. At this moment, the receivers located at the relevant area automatically start to switch over to the broadcast in the specified channel on the basis of the information on the start/end flag and transmission/signal class and present the emergency information. On the other hand, the receivers not located in the relevant area continue presenting the normal broadcast. Thereby, the report system can accurately and quickly notify the emergency information such as the disaster information and the disaster prevention information to the receivers in the specified area.

In the aforementioned embodiment, having described the case in which the broadcast system is the terrestrial digital broadcast, the present invention is not limited to this embodiment; the invention may be embodied even in a broadcast system employing other broadcast system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An emergency information reporting system which promptly reports emergency information to a specified area by utilizing a broadcast system in which broadcast stations broadcast digital broadcast signals of normal programs, comprising:

a plurality of emergency information requesting apparatuses configured to send requests to broadcast reports of the emergency information, the requests including information identifying objective areas;

an emergency broadcast processing apparatus configured to:

automatically receive the emergency information requests from the plurality of emergency information requesting apparatuses, determine which one or more of the broadcast stations are associated with the specified area, and instruct the one or more of the broadcast stations determined to be associated with the specified area to broadcast the reports of the emergency information; and in-station processing apparatuses, which are installed in the one or more broadcast stations determined to be associated with the specified area, wherein the in-station processing apparatuses multiplex the emergency information with the digital broadcast signals of the normal programs for the objective areas by placing contents of an emergency broadcast descriptor on an auxiliary channel (AC) carrier and placing the emergency information on a transmission stream (TS) signal and the AC carrier, and wherein the multiplexing is performed in response to instructions received from the plurality of emergency broadcast processing apparatuses for the one or more broadcast stations determined to be associated with the specified area.

2. The emergency information prompt report system according to claim 1, wherein the in-station processing apparatuses multiplex the emergency information with the TS signal as the digital broadcast signal.

3. A transmitting system which broadcasts digital broadcast signals of normal programs and promptly reports emergency information, the transmitting system configured to:

receive a request for emergency information;

generate an emergency broadcast transmission stream (TS) signal by arranging the emergency information on an auxiliary channel (AC) carrier;

place contents of an emergency broadcast descriptor on the AC carrier, and place the emergency information on the emergency broadcast TS signal and the AC carrier; and multiplex the emergency broadcast TS signal with the digital broadcast signals of the normal programs.

4. The transmitting system according to claim 3, wherein the transmitting system multiplexes the emergency information with the emergency broadcast TS signal as the digital broadcast signal.

* * * * *